UNITED STATES PATENT OFFICE.

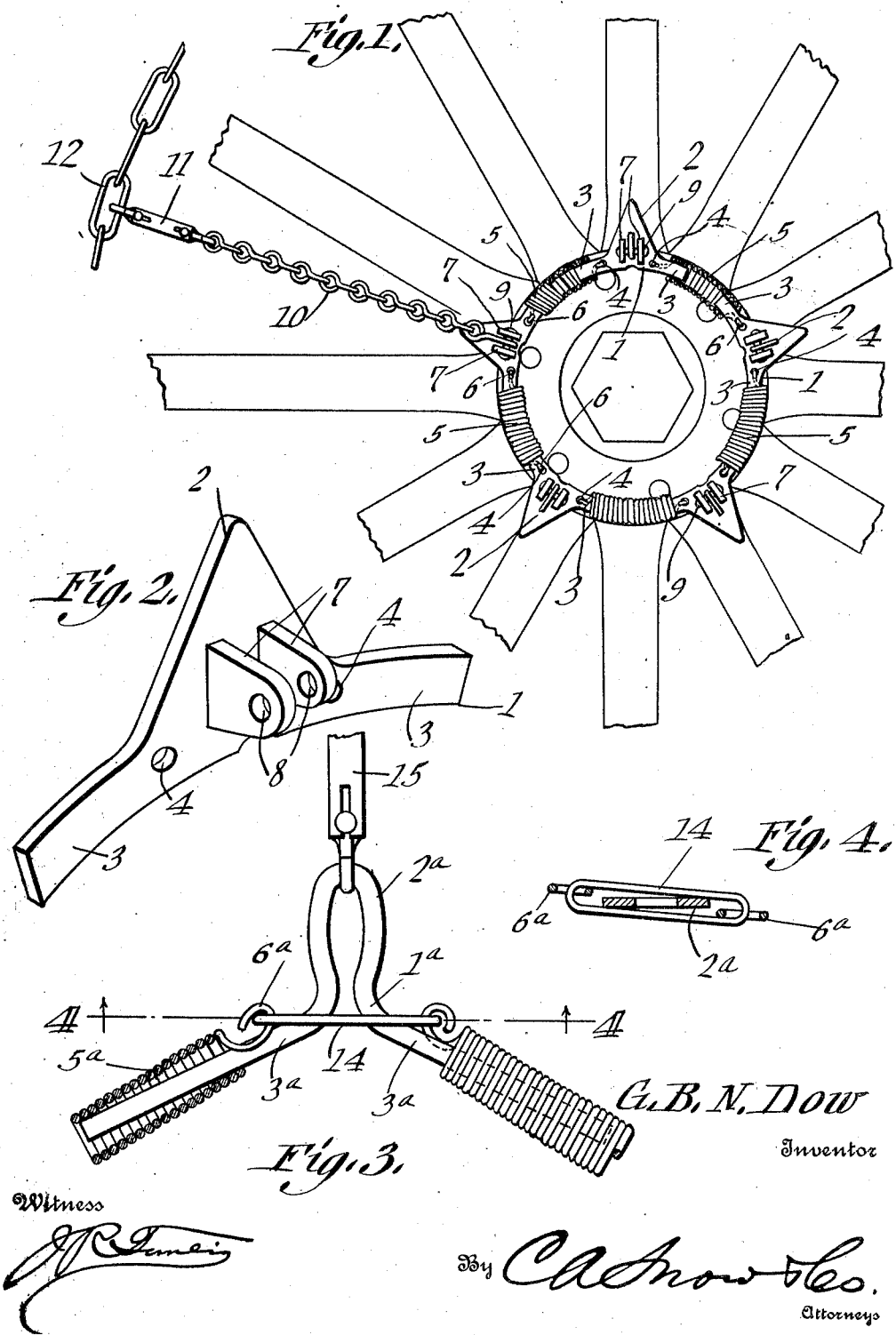

GEORGE B. N. DOW, OF MANCHESTER, NEW HAMPSHIRE, ASSIGNOR OF ONE-HALF TO FRANK COLE, OF MANCHESTER, NEW HAMPSHIRE.

ANTISKID-CHAIN HOLDER.

1,315,099.     Specification of Letters Patent.     Patented Sept. 2, 1919.

Application filed April 16, 1919. Serial No. 290,593.

*To all whom it may concern:*

Be it known that I, GEORGE B. N. Dow, a citizen of the United States, residing at Manchester, in the county of Hillsborough and State of New Hampshire, have invented a new and useful Antiskid-Chain Holder, of which the following is a specification.

This invention aims to provide novel means for drawing inwardly, radial elements adapted to be assembled with an antiskid chain or other tire-carried member.

Within the scope of what is claimed, a mechanic may work changes without departing from the spirit of the invention.

In the drawings:—Figure 1 shows one form of the invention, in side elevation, mounted on a wheel; Fig. 2 is a drawing in perspective, disclosing one of the main members; Fig. 3 is an elevation showing a portion of a structure disclosing a modification, parts being in section; Fig. 4 is a section on the line 4—4 of Fig. 3.

Referring to Figs. 1 and 2, the device may be stated to comprise a body including main members 1 having heads 2 and arms 3 projecting in opposite directions from the heads, the heads having openings 4. Retractile helical springs 5 are provided, the ends of the springs receiving the arms 3 of adjoining main members 1, the springs terminating in hooks 6 engaged in the openings 4 to form means for securing the ends of the springs to the main members 1. The heads 2 of the main members 1 have projecting ears 7 provided with openings 8 receiving securing devices 9, which may be rivets, carrying the inner ends of radial elements, such as chains, the outer extremities of the chains being connected by double-ended snaps 11 with some part of a tire-carried member, for instance, with the links 12 of an anti-skid chain. Obviously, the retractile springs 5 tend to decrease the diameter of the body and to draw the chains 10 inwardly, thereby holding the anti-skid device on the tire.

In Figs. 3 and 4, parts hereinbefore described are designated by numerals previously used, with the suffix "a." The heads 2$^a$ are of loop-shape and receive links 14, the ends of which are engaged by the hooks 6$^a$ of the springs 5$^a$. The radial members 10 may be connected with the loop-shaped heads 2$^a$ as shown in Fig. 1, or, if desired, the radial members may be united with the heads by means of snaps 15. The links 14 and the hooks 6$^a$ constitute means for securing the ends of the springs 5$^a$ to the main members 1$^a$ of the body, the springs 5$^a$ exercising a retractile function, as hereinbefore set forth in connection with that form of the invention which is disclosed in Fig. 1.

What is claimed is:—

1. A device of the class described comprising a body including main members having heads and arms projecting in opposite directions from the heads; helical springs wherein the arms of adjoining main members are received; means for securing the ends of the springs to the main members; and radial elements provided at their outer ends with means for engaging a tire-carried member, the inner ends of said elements being connected with the heads.

2. A device of the class described comprising a body including main members having outwardly extended heads and arms extended in opposite directions from the heads; links receiving the heads; helical springs wherein the arms of adjoining main members are received, the springs being provided with means for engaging the links; and radial elements supplied at their outer ends with means for engaging a tire-carried member, the inner ends of said elements being connected with the heads.

3. A device of the class described comprising a body including main members having outwardly projecting heads and arms extended in opposite directions from the heads, the heads being of U-shape; links receiving the heads; helical springs wherein the arms of adjoining main members are received, the springs having means for engaging links; and radial elements provided at their outer ends with means for engaging a tire-carried member, the inner ends of said elements being connected with the heads.

In testimony that I claim the foregoing as my own, I have hereto affixed my signature in the presence of two witnesses.

GEORGE B. N. DOW.

Witnesses:
    ANNETTE PERKINS,
    D. W. PERKINS.

Copies of this patent may be obtained for five cents each, by addressing the "Commissioner of Patents, Washington, D. C."